(12) United States Patent
O'Brien et al.

(10) Patent No.: US 7,864,505 B1
(45) Date of Patent: Jan. 4, 2011

(54) STRUCTURAL CAPACITORS AND COMPONENTS THEREOF

(75) Inventors: Daniel J. O'Brien, Forest Hill, MD (US); Eric D. Wetzel, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 486 days.

(21) Appl. No.: 11/594,862

(22) Filed: Nov. 9, 2006

Related U.S. Application Data

(60) Provisional application No. 60/735,998, filed on Nov. 9, 2005.

(51) Int. Cl.
*H01G 4/06* (2006.01)
*H01G 4/005* (2006.01)

(52) U.S. Cl. ...................... 361/311; 361/303
(58) Field of Classification Search ................ 361/311, 361/303, 301.4, 301.3, 323
See application file for complete search history.

(56) References Cited

U.S. PATENT DOCUMENTS

| | | | | |
|---|---|---|---|---|
| 4,001,656 A | * | 1/1977 | Voyles | 361/540 |
| 4,535,382 A | * | 8/1985 | Wada et al. | 361/319 |
| 5,121,301 A | | 6/1992 | Kurabayashi et al. | |
| 5,168,421 A | * | 12/1992 | Suzuki et al. | 361/323 |
| 5,793,603 A | * | 8/1998 | Lyman | 361/503 |
| 5,898,561 A | * | 4/1999 | Mandelcorn et al. | 361/301.4 |
| 6,092,269 A | * | 7/2000 | Yializis et al. | 29/25.42 |
| 6,404,615 B1 | * | 6/2002 | Wijeyesekera et al. | 361/306.1 |
| 6,981,671 B1 | * | 1/2006 | Baron et al. | 244/1 A |
| 7,057,881 B2 | * | 6/2006 | Chow et al. | 361/508 |
| 7,486,498 B2 | * | 2/2009 | Welsch et al. | 361/523 |
| 2003/0169558 A1 | * | 9/2003 | Olson et al. | 361/502 |
| 2005/0168919 A1 | * | 8/2005 | Welsch et al. | 361/525 |
| 2006/0171100 A1 | * | 8/2006 | Uematsu et al. | 361/323 |
| 2007/0027246 A1 | * | 2/2007 | Shin et al. | 524/432 |

FOREIGN PATENT DOCUMENTS

JP   04160705 A   *   6/1992

OTHER PUBLICATIONS

Scott et al., "Multifunctional power-generating and energy-storing structural composites for US Army applications", Nov. 29-Dec. 3, 2004 (conference dates), NN 4.6.1-NN 4.6.7.*
Luo, et al. "Carbon-fiber/polymer-matrix composites as capacitors" Comp. Sci. Tech., 61, 885-888 (2001).

* cited by examiner

*Primary Examiner*—Eric Thomas
(74) *Attorney, Agent, or Firm*—William V. Adams; Christos S. Kyriakou

(57) ABSTRACT

A structural capacitor includes at least one pair of electrodes comprising a positive electrode and a negative electrode, with a body of dielectric material disposed therebetween. The combination of the electrodes and dielectric has a stiffness which can be between 10 1000 GPa, and in some instances between 50 MPa-100 GPa. Failure strength of the combination can be between 1 MPa-10 GPa, and in specific instances between 10 MPa-1 GPa. The capacitor may include a plurality of electrode pairs. The dielectric may include a reinforcing material therein, and the capacitors may be configured in a variety of shapes so as to function as structural elements for articles of construction.

22 Claims, 2 Drawing Sheets

STRUCTURAL CAPACITORS AND COMPONENTS THEREOF

RELATED APPLICATION

This application claims priority of U.S. Provisional Patent Application Ser. No. 60/735,998 filed Nov. 9, 2005, entitled "Structural Capacitors".

GOVERNMENT INTEREST

The invention described herein may be manufactured, used, and licensed by or for the United States Government.

FIELD OF THE INVENTION

This invention relates generally to capacitors which operate to store electrical energy. More specifically, the invention relates to capacitors which are configured to function as structural elements of devices in which they are incorporated. In specific instances, the invention relates to particular components of structural capacitors such as electrodes and dielectric materials, and to methods for their manufacture.

BACKGROUND OF THE INVENTION

Capacitors are electrical devices which store and release electrical energy. A capacitor will include at least one pair of electrodes separated, typically by a relatively small distance, by a body of dielectric material. Charge is stored in the capacitor by polarizing the device so that one of the electrodes, referred to as a cathode or negative electrode, will have a net negative charge, and the other electrode, referred to as an anode or positive electrode, will have a net positive charge. The body of dielectric material prevents charge from migrating between the electrodes. Capacitors may be fabricated in a variety of configurations. In some embodiments, a plurality of pairs of positive and negative electrodes are disposed in an interleaved negative-positive relationship. In other instances, a single pair of electrodes, each comprising a relatively large body of thin, flexible material, together with a flexible dielectric material, are disposed in a rolled relationship so as to form a capacitor device.

Capacitors can store, and rapidly release, relatively large amounts of energy. Because of their high current capacity, capacitors are used in a variety of electrical systems. For example, capacitors are used in communications devices such as radios and cellular telephones for the purpose of providing a high burst of power for initiating broadcast of a transmission. Capacitors are also used to provide power for starting electrical motors and energizing flash lamps and lasers. The high current capability of capacitors also makes them useful in specialized military systems including armor and munitions.

Capacitors of the type used for delivery of relatively high levels of power are generally fairly large bulky items, and their size and weight can impose a significant design constraint on systems, particularly portable systems, in which they are included. Heretofore, these size and weight constraints have limited the utility and practicality of particular systems. As will be described in detail hereinbelow, the present invention recognizes that by the appropriate selection of materials, capacitors may be manufactured which combine good structural properties such as strength and stiffness together with good electrical properties. Such capacitors may actually form structural elements of systems in which they are incorporated, and hence these capacitors are referred to herein as "structural capacitors." Since structural capacitors function both as capacitive storage devices as well as structural components of systems, the weight and/or size burden imposed upon such systems by the need for capacitive storage is greatly minimized. In this regard, the structural capacitors of the present invention may function as circuit boards, housings, casings, protective members, and the like. Further details and advantages of the present invention will be apparent from the drawings, discussion and description which follow.

SUMMARY OF THE INVENTION

Disclosed herein is a structural capacitor which is comprised of at least one pair of electrodes which pair comprises a positive electrode and a negative electrode, and a body of dielectric material disposed between the electrodes. In the structural capacitor of the present invention, a combination which consists of the electrodes and the dielectric has a stiffness generally of at least 10 MPa, and in particular instances between 10 MPa-1000 GPa, and in specific instances between 50 MPa-100 GPa. In a further aspect of the invention, the combination of the electrodes and dielectric has a failure strength of at least 1 MPa, and typically between 1 MPa-10 GPa, and specifically between 10 MPa-1 GPa. Herein, "stiffness" refers to the general engineering property of a material that describes the amount of stress required to impart strain on the material. The ranges in system stiffness values are intended to reflect a range of loading modes, including tension, compression, shear, bending, torsion, and any combination of these loads. Similarly, "failure strength" is intended to refer to the limiting stress required to cause irreversible damage to the material, and is intended to reflect a range of loading modes, including tension, compression, shear, bending, torsion, and any combination of these loads.

In some embodiments, the structural capacitor includes a plurality of pairs of electrodes, and these electrodes are disposed in an interstratified relationship with a body of dielectric material being disposed therebetween. The body of dielectric material may comprise a thermoplastic, thermosetting, or elastomeric polymer such as a polycarbonate, an epoxy, a polyester, and combinations thereof. In particular instances, a reinforcing material may be disposed in the dielectric material. The reinforcing material may be an inorganic material such as glass, ceramics, minerals, or the like or it may be an organic material such as an organic polymer. The reinforcing material may be present in the form of fibers and these fibers may be configured into a woven or nonwoven fabric, or they may be a plurality of cut fibers disposed in an aligned or random relationship.

In some embodiments, the electrodes are comprised of a metal and in particular instances may comprise thin metallic films. In other instances, the electrodes may be comprised of a fibrous material, and this fibrous material may comprise glass fibers coated with a metal or it may comprise carbon fibers which may optionally be coated with a metal. In some instances, the dielectric material may be configured as a solid matrix having a dielectric fluid disposed therein, and this dielectric fluid may comprise a liquid or a gas.

DESCRIPTION OF THE PREFERRED EMBODIMENTS

The present invention includes structural capacitors, which as described above, are capacitors which include one or more active components having sufficient strength and rigidity to allow these capacitors to function as structural elements in various constructions and devices. The structural capacitors of the present invention, as with all capacitors, will include at least one pair of electrodes comprised of a positive electrode and a negative electrode, and a body of dielectric material disposed therebetween. It is a feature of the present invention that the combination of the electrodes and dielectric material have a stiffness typically at least 10 MPa, and in particular instances between 10 MPa-1000 GPa, and in certain instances between 50 MPa-100 GPa, as measured in accord with conventional practices well known in the engineering arts. In addition to the foregoing, the failure strength of the combination of electrodes and dielectric is typically at least 1 MPa, and in particular instances between 1 MPa-10 GPa, and in certain instances between 10 MPa-1 GPa.

The various elements of the capacitor may differ in stiffness and failure strength; however, taken collectively, all contribute to the strength and integrity of the capacitor. In specific instances, the stiffness of the dielectric is at least 1 MPa and the stiffness of either of the electrodes of the pair will also be at least 1 MPa.

Figure 1:
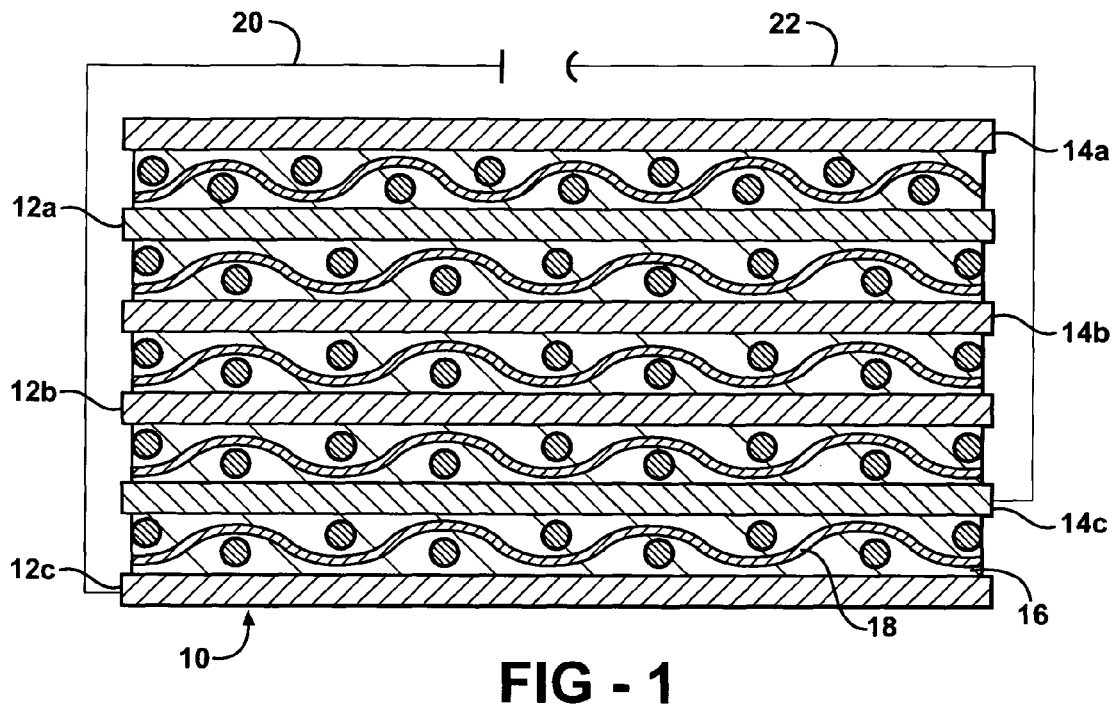
FIG. 1 is a cross-sectional view of one embodiment of structural capacitor fabricated in accord with the present invention.

In typical high power capacitors, the dielectric material accounts for the majority of the device. Hence, in the structural capacitors of the present invention, this dielectric material is engineered to have good mechanical properties. Furthermore, in some instances, the electrodes themselves are engineered to have good mechanical properties. A typical structural capacitor of the present invention will comprise many thin layers of dielectric material sandwiched between electrodes. Referring now to FIG. 1, there is shown a schematic embodiment of one embodiment of structural capacitor 10 in accord with the present invention. As shown, this capacitor 10 includes a plurality of cathode electrodes 12a, 12b, 12c interdigitated with a corresponding plurality of anode electrodes 14a, 14b, 14c. A body of dielectric material 16 is interposed between the electrodes. As illustrated, the dielectric material 16 includes a reinforcing material, which in this instance is a glass fiber fabric 18 disposed therein. As illustrated, the cathode electrodes 12 are all in electrical communication with a first electrical lead 20, and the anode electrodes 14 are in electrical communication with a second electrode 22.

It is to be understood that other configurations of structural capacitor may likewise be prepared in accord with the present invention. For example, a larger or smaller number of anode/cathode pairs may be included in the capacitor. Also, while the dielectric 16 is shown as being reinforced by a glass fiber fabric 18, in some embodiments, the reinforcement material may be eliminated. In other instances, other reinforcement materials including ceramic materials such as SiC, mineral fibers such as quartz or alumina, as well as organic polymeric fibers such as polyimides and the like may be utilized as reinforcing materials. These fibers may be in the form of woven fabrics, nonwoven fabrics such as felts, or individual aligned or unaligned fibers. In yet other instances, reinforcement materials may comprise powders, plates, or other configured particles. In addition to mechanical reinforcement, the reinforcing material may also act as a dielectric material, and may increase the effective dielectric constant or dielectric strength of the dielectric layer between the electrodes.

The capacitors of the present invention may be fabricated in a variety of shapes and sizes. For example, the capacitor 10 of FIG. 1 may be configured as an elongated beam, a plate, a block or the like. Also, while the capacitor is shown as being a relatively planar device, other shapes such as hollow beams, curved members, cylinders, and complex shapes such as I-beams, may be fabricated. The structural capacitors of the present invention may be utilized as support struts, casings, housings, protective sheathing or the like.

The dielectric component comprises a significant weight and volume proportion of the capacitor, and as such it is generally desirable that its mechanical and electrical properties be optimized for particular applications. There are a variety of materials which may be utilized as the dielectric material, and one specific group of materials comprises organic polymers. Such materials can combine good mechanical properties with high dielectric strengths. While a variety of polymeric materials may be employed, some particular materials having utility in the present invention include polycarbonates. These materials are tough and have high temperature resistance, and as such remain amorphous during thermal processing. Another group of materials which may be employed in the present invention include epoxy resins. These materials may be employed in the form of hardenable compositions, and exhibit high dielectric strength and good mechanical properties. In yet other instances, the dielectric material may comprise an inorganic material such as a ceramic, a glass, or various composites having good dielectric and mechanical properties. The inorganic materials may also include reinforcing materials therein, and may be configured in a manner similar to the polymeric materials.

In some particular instances, the dielectric material may comprise a solid matrix having a dielectric fluid disposed therein. Such fluids may comprise dielectric liquids such as mineral oil, silicone fluids and the like; or they may comprise gaseous fluids such as $SF_6$. In particular instances, the matrix may comprise, for example, a honeycomb structure, a foam, or other such cellular structure. The dielectric fluid may also be encapsulated, with said encapsulated fluid bodies dispersed within the solid matrix, or may take the form of a percolating network that interpenetrates the solid matrix.

The electrode components of the structural capacitors may be variously configured. In simplest form, the electrodes may comprise thin metal plates or foils spaced from one another by the dielectric material. In other instances, the electrodes may be metal meshes or screens or fabrics which include metal fibers. The surfaces of these electrodes may be smooth or textured. In some instances, the electrodes may comprise relatively thin metalized films disposed upon opposite surfaces of a body of dielectric material by techniques such as vacuum deposition, electroplating, plasma spray, chemical vapor deposition, electroless plating or the like. In some instances, it has been found to be advantageous to utilize fairly thin metal films as electrodes. These films typically have a thickness in the range of 10-200 nanometers, with thicknesses of approximately 20 nm being employed in particular instances. It has been found that such thin electrode films provide a "self-clearing" capability to capacitors in which they are utilized. In devices of this type, damage resultant from localized dielectric breakdown will evaporate, ablate, or otherwise remove the electrode material in the region of the damage thereby isolating the damaged region from the remainder of the capacitor, thus preventing short circuiting. In other instances, the electrodes will themselves contribute to the strength of the capacitor, and in such embodiments, the electrodes typically comprise metallic members having a thickness in the range of 0.01 to 10 mm, preferably in the range of 0.1 to 1 millimeter. These metallic members can take the form of a metal foil, metal screen, metal mesh, or a fabric containing metal fibers.

In yet other instances, the electrodes may be of a more complex structure. For example, the electrodes may be comprised of fibers of glass or some other such dielectric material having a thin metalized coating disposed thereupon. In yet other instances, the electrodes may be comprised of electrically conductive fibers such as carbon fibers or carbon nanotubes which may be in the form of short, chopped carbon fibers, aligned continuous fibers, as well as woven or non-woven fabrics. These carbon fibers may be further coated with a metal to enhance their electrical conductivity. In some instances, positive and negative electrodes may be configured as alternating filaments or yarns within a fabric layer. All of such embodiments, including modifications and variations thereof, are within the scope of this invention.

The electrodes used in the capacitors of the present invention may be made from materials other than metals. For example, electrically conductive inorganic materials such as tin oxide, indium oxide, indium tin oxide, and the like may be utilized as electrodes. These materials are transparent, and if used in combination with a transparent dielectric material, may be employed so as to fabricate an optically transparent, structural capacitor. Such transparent capacitors will have particular utility in specialized applications such as vehicular windows and the like. Further materials such as fluorescent dyes, coloring agents, liquid crystal materials, and the like may be incorporated into transparent capacitor structures of this type, either in the dielectric material, the electrode material, or as an auxiliary material, so as to further control the optical properties of such capacitors.

The capacitor of the present invention may be fabricated using a range of manufacturing methods known to those skilled in the art of composites and composite assembly fabrication. The electrodes and dielectric may consist of comprised of a fibrous material impregnated with a curable polymeric material utilizing known "prepreg" technology, or they may consist of dry fibrous reinforcement that is infused with flowable prepolymer. In other cases, the prepreg may consist of melt-formable thermoplastic materials, polymerizable thermoplastic prepolymers, or solvent containing dissolved polymer. In all cases, a combination of pressure, time, elevated temperature, and or radiation is used to consolidate or cure the matrix material and bond together the material layers in the assembly.

The principles of the present invention were evaluated in a series of experiments involving high strength capacitor structures prepared in accord with the present invention. One series of capacitors was prepared utilizing a homogeneous polycarbonate material, and in that regard polycarbonate sheets having a thickness of approximately 0.254 mm were employed. In another series, polycarbonate composites were manufactured by placing glass fabric between two layers of the aforementioned 0.254 mm polycarbonate films, and consolidating them in a hot press at approximately 230° C. for 20 minutes at a pressure of approximately 2.87 kPa. A third series of dielectric materials comprising an epoxy/glass composite were prepared utilizing an amine-cured epoxy (Epon 828 cured with PACM). In this procedure, glass fiber fabric was soaked in the resin, the wet fabric thoroughly degassed, and the resultant impregnated fabric cured between glass plates at 150° C. to produce the composite. In each instance, the resultant body of dielectric material had 20 nm thick aluminum electrodes deposited on opposed faces thereof by a sputtering process. As noted above, such thin electrodes increase flaw tolerance in resultant capacitor structures through self-clearing, since local dielectric breakdown and arcing at flaw sites causes local sublimation of the metal effectively insulating the flaw.

The resultant capacitor structures were evaluated with regard to their electrical properties. The capacitance of the polycarbonate structures was approximately 575 pF. The capacitance of the polycarbonate/glass composite based structures was approximately 348 pF and that of the epoxy/glass composites was approximately 508 pF.

Figure 2:
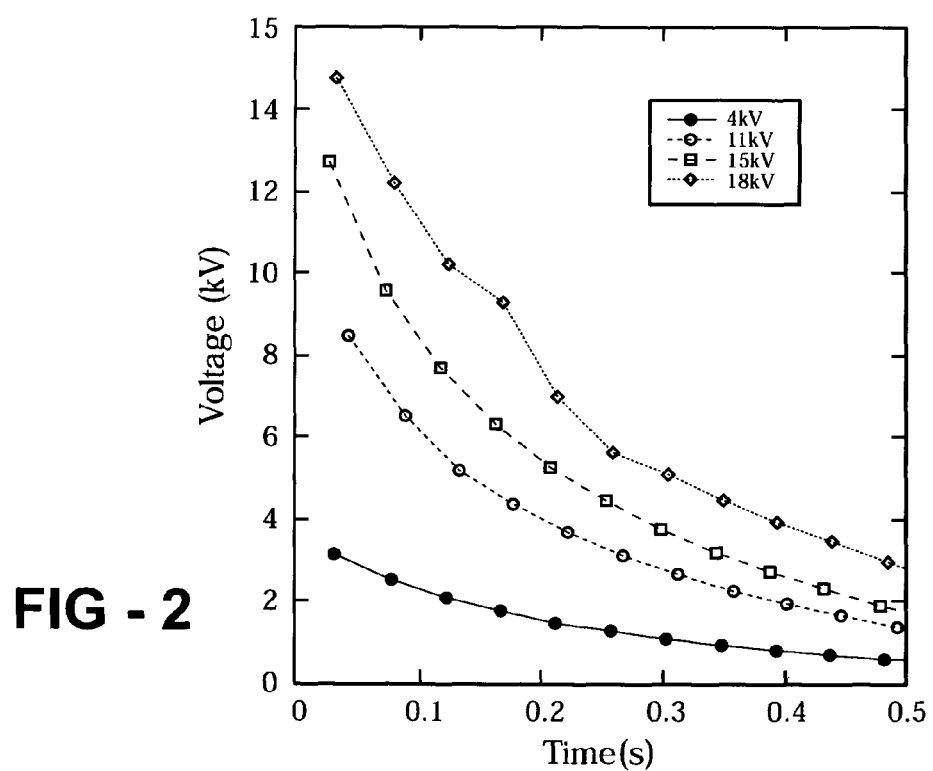
FIG. 2 is a graph showing the discharge characteristics, in terms of voltage versus time for a large resistive load, for a capacitor of the present invention which incorporates a polycarbonate dielectric.
Figure 3:
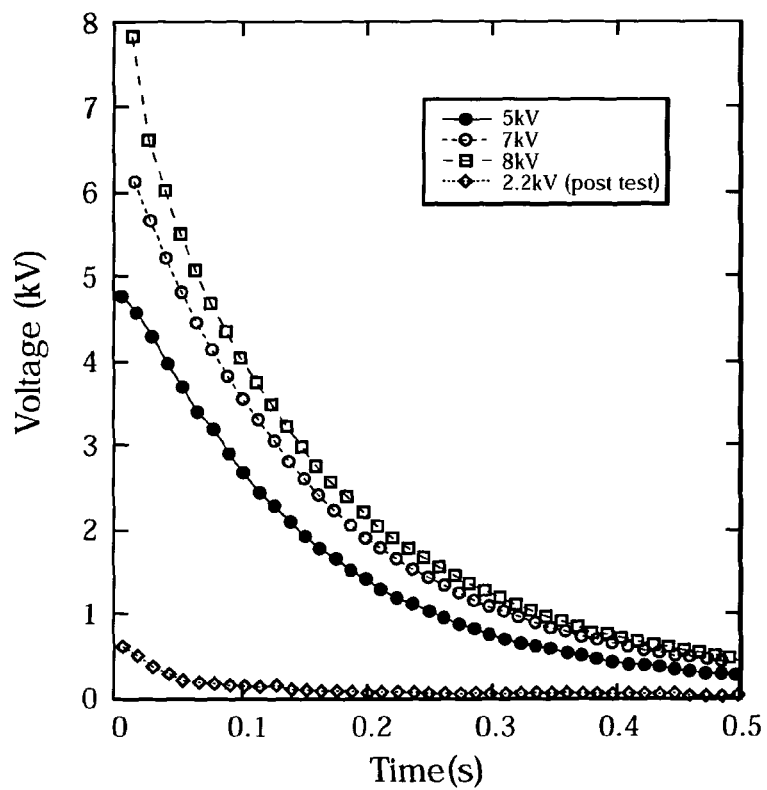
FIG. 3 is a graph showing the discharge characteristics, in terms of voltage versus time for a large resistive load, for a capacitor of the present invention which incorporates a polycarbonate/glass fiber dielectric.
Figure 4:
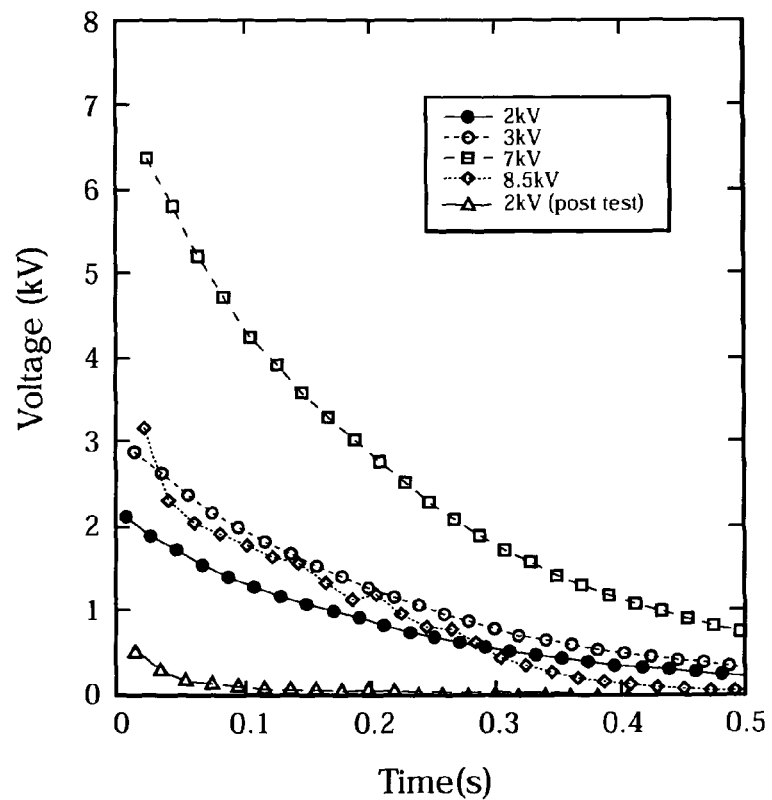
FIG. 4 is a graph showing the discharge characteristics, in terms of voltage of versus time for a large resistive load, for a capacitor of the present invention which includes a dielectric fabricated from an epoxy/glass fabric composite.

FIG. 2 hereinbelow shows the discharge characteristics through a 360 MΩ resistor, in terms of voltage versus time for the polycarbonate capacitor at charging voltages ranging from 4 kV to 18 kV. FIG. 3 shows a discharge behavior through a 360 MΩ resistor of the polycarbonate/glass dielectric based capacitor in terms of voltage versus time for charging voltages ranging from 8 kV to 2.2 kV. FIG. 4 shows similar data for discharge through a through a 360 MΩ resistor for the epoxy/glass dielectric based material at voltages ranging from 8.5 kV to 2 kV.

In this experimental series, the polycarbonate based capacitors showed the best performance. Both of the composite specimens reached a maximum performance at approximately 8 kV, after which capacitive energy density drops off significantly due to dielectric breakdown. While not wishing to be bound by speculation, Applicant presumes that this loss in performance of the composite materials is due to the glass fiber reinforcing yarns not being completely impregnated by the polymeric material thereby resulting in the presence of air-filled voids which can be prone to dielectric breakdown. Alternatively, dielectric breakdown could occur at yarn/yarn crossovers due to low dielectric strength regions being present in the glass. In either instance, dielectric strength of the composite, and hence overall performance of capacitors, could be increased by better material control.

In this experimental series, the discharge times are relatively slow, in the range of tens or hundreds of milliseconds. These slow discharge times result from the use of a very large load resistor, which allows for easier discharge laboratory measurements. It is understood by those skilled in the art that much faster discharge times are possible, and preferable for many applications, by using lower load resistances.

The foregoing describes some particular embodiments of the present invention. In view of the teaching and discussion presented herein, one of skill in the art could readily prepare yet other embodiments of structural capacitors in accord with the principles of the present invention. All of such modifications and variations are within the scope of the invention. The foregoing drawings, discussion and description are illustrative of some specific embodiments, but are not meant to be limitations upon the practice thereof. It is the following claims, including all equivalents, which define the scope of the invention.

The invention claimed is:

1. A device that comprises a high-strength structural capacitor that operates to store and release large amounts of electrical energy and that functions as a structural element in the device into which the high-strength structural capacitor is incorporated said high-strength structural capacitor comprising at least one pair of electrodes, said pair of electrodes comprising a positive electrode and a negative electrode; and a body of dielectric material disposed between said electrodes wherein the body of dielectric material accounts for a majority of the mass of the structural element or a majority of the volume of the structural element;

wherein the combination consisting of said electrodes and said body of dielectric material has a stiffness of at least 10 MPa in a tension loading mode, in a compression loading mode, in a shear loading mode, in a bending loading mode and in a torsion loading mode further wherein said high-strength structural capacitor stores and releases energy at an energy density of at least about 0.1 J/cc.

2. The high-strength structural capacitor of claim 1, wherein said combination has a stiffness in the range of 50 MPa to 100 GPa in a tension loading mode, in a compression loading mode, in a shear loading mode, in a bending loading mode and in a torsion loading mode.

3. The high-strength structural capacitor of claim 1, wherein said combination has a failure strength of at least 1 MPa in a tension loading mode, in a compression loading mode, in a shear loading mode, in a bending loading mode and in a torsion loading mode.

4. The high-strength structural capacitor of claim 1, wherein said combination has a failure strength in the range of 10 MPa to 1 GPa in a tension loading mode, in a compression loading mode, in a shear loading mode, in a bending loading mode and in a torsion loading mode.

5. The high-strength structural capacitor of claim 1, wherein said capacitor is a structural beam, a structural I-beam, a structural plate, a structural block, a structural strut, a structural casing, a structural housing or a protective sheathing structure or other protective member in or on said device.

6. The high-strength structural capacitor of claim 1, wherein said capacitor is a structural beam, a structural I-beam, a structural block or a structural strut in said device.

7. The high-strength structural capacitor of claim 1, comprising a plurality of said pairs of electrodes, said electrodes being disposed in an interstratified relationship with said body of dielectric material being disposed therebetween.

8. The high-strength structural capacitor of claim 1, wherein said body of dielectric material comprises a polymer.

9. The high-strength structural capacitor of claim 8, wherein said polymer is selected from the group consisting of polycarbonates, epoxies, polyesters, and combinations thereof.

10. The high-strength structural capacitor of claim 1, wherein said body of dielectric material includes a reinforcing material disposed therein.

11. The high-strength structural capacitor of claim 10, wherein said reinforcing material is selected from the group consisting of glass, ceramics, minerals, organic polymers, and combinations thereof.

12. The high-strength structural capacitor of claim 10, wherein said reinforcing material is present in the form of fibers.

13. The high-strength structural capacitor of claim 10, wherein said reinforcing material increases the dielectric strength and/or dielectric constant of the body of dielectric material.

14. The high-strength structural capacitor of claim 1, wherein said electrodes are comprised of a metal.

15. The high-strength structural capacitor of claim 14, wherein said electrodes are comprised of: a metal foil, a metal mesh, a metal screen, or a fabric containing metal fibers.

16. The high-strength structural capacitor of claim 1, wherein said electrodes comprise thin metallic films disposed upon said body of dielectric material.

17. The high-strength structural capacitor of claim 16, wherein said thin metallic films have a thickness in the range of 10-200 nm.

18. The high-strength structural capacitor of claim 1, wherein said electrodes are comprised of carbon fibers.

19. The high-strength structural capacitor of claim 18, wherein said carbon fibers have a coating of a metal disposed thereupon.

20. The high-strength structural capacitor of claim 1, wherein said electrodes of at least one of said at least one pair of electrodes are spaced apart by a distance in the range of 0.1 to 1 mm.

21. The high-strength structural capacitor of claim 1, wherein said electrodes of at least one of said at least one pair of electrodes are spaced apart by a distance in the range of 0.001 to 50 mm.

22. The high-strength structural capacitor of claim 1, wherein said body of dielectric material comprises a solid matrix having a gaseous or liquid dielectric fluid retained therein.

* * * * *